United States Patent
Berke et al.

(10) Patent No.: US 9,762,418 B2
(45) Date of Patent: Sep. 12, 2017

(54) REPEATABLE BACKCHANNEL LINK ADAPTATION FOR HIGH SPEED SERIAL INTERFACES

(71) Applicant: Dell Products, LP, Round Rock, TX (US)

(72) Inventors: Stuart Allen Berke, Austin, TX (US); Bhyrav M. Mutnury, Round Rock, TX (US); Minchuan Wang, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 246 days.

(21) Appl. No.: 14/534,833

(22) Filed: Nov. 6, 2014

(65) Prior Publication Data
US 2016/0134443 A1    May 12, 2016

(51) Int. Cl.
*H04L 25/03* (2006.01)
*H04L 25/06* (2006.01)

(52) U.S. Cl.
CPC ...... *H04L 25/061* (2013.01); *H04L 25/03885* (2013.01); *H04L 25/03949* (2013.01)

(58) Field of Classification Search
CPC .......... H04L 25/0264; H04L 25/03006; H04L 25/03019; H04L 25/03878; H04L 25/03885; H04L 25/03949; H04L 25/061
USPC ....... 375/219, 220, 229, 232, 257, 285, 346, 375/348–350
See application file for complete search history.

(56) References Cited

U.S. PATENT DOCUMENTS

| | | | |
|---|---|---|---|
| 8,654,898 B2 | 2/2014 | Bereza et al. | |
| 9,106,462 B1 * | 8/2015 | Aziz | H04L 25/03057 |
| 9,313,056 B1 * | 4/2016 | Berke | H04L 25/03878 |
| 2005/0112369 A1 | 5/2005 | Ibbitson et al. | |
| 2008/0112476 A1 * | 5/2008 | Vong | H04L 25/4904 375/224 |
| 2009/0097541 A1 * | 4/2009 | Aziz | H04L 1/205 375/233 |
| 2012/0044983 A1 * | 2/2012 | Kerr | H04L 25/03057 375/233 |
| 2013/0107934 A1 * | 5/2013 | Zhou | H04L 25/03885 375/232 |
| 2013/0112566 A1 | 5/2013 | Muranushi et al. | |
| 2013/0148712 A1 * | 6/2013 | Malipatil | H04L 25/0307 375/233 |
| 2013/0287088 A1 * | 10/2013 | Mobin | H04L 7/10 375/233 |

(Continued)

FOREIGN PATENT DOCUMENTS

EP    WO 2010/0121938 A1    10/2010

*Primary Examiner* — Young T Tse
(74) *Attorney, Agent, or Firm* — Larson Newman, LLP (57) ABSTRACT

A receiver includes a plurality of equalization modules each configurable to provide a selectable compensation value to a data bit stream received by the receiver, and a control module configured to perform a plurality of back channel adaptations on the data bitstream to achieve a target bit error rate for the receiver, each back channel adaptation being associated with a set of compensation values of the equalization modules, determine a most common set of compensation values derived from the performance of the plurality of back channel adaptations, and determine an optimized set of compensation values based on the most common set of compensation values.

20 Claims, 5 Drawing Sheets

(56) References Cited

U.S. PATENT DOCUMENTS

| | | | |
|---|---|---|---|
| 2014/0044160 A1* | 2/2014 | Lee ................... | H04L 25/03019 |
| | | | 375/232 |
| 2014/0169426 A1* | 6/2014 | Aziz ................ | H04L 25/03057 |
| | | | 375/224 |
| 2014/0169440 A1* | 6/2014 | Kotagiri ................ | H04L 25/063 |
| | | | 375/233 |
| 2014/0269881 A1* | 9/2014 | He .................... | H04L 25/03343 |
| | | | 375/231 |
| 2016/0087816 A1* | 3/2016 | Patel ................ | H04L 25/03019 |
| | | | 375/232 |
| 2016/0105296 A1* | 4/2016 | Berke .............. | H04L 25/03057 |
| | | | 375/233 |
| 2016/0132459 A1* | 5/2016 | Patel ................ | H04L 25/03834 |
| | | | 710/106 |

* cited by examiner

REPEATABLE BACKCHANNEL LINK ADAPTATION FOR HIGH SPEED SERIAL INTERFACES

FIELD OF THE DISCLOSURE

This disclosure generally relates to information handling systems, and more particularly relates to repeatable backchannel link adaptation in a high speed serial interface.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

As the speed of high speed serial interfaces increases, variations in circuit design, component manufacture, environmental conditions, and other factors make it increasingly difficult to ensure highly reliable data transmission. In particular, transmitter and receiver equalization mechanisms to compensate for channel loss are calibrated on a best-effort basis, where settings that result in a "good enough" compensation solution are quickly obtained, in favor of iterative processes that might yield a more optimal solution, but which require an inordinate amount of time for such link training.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
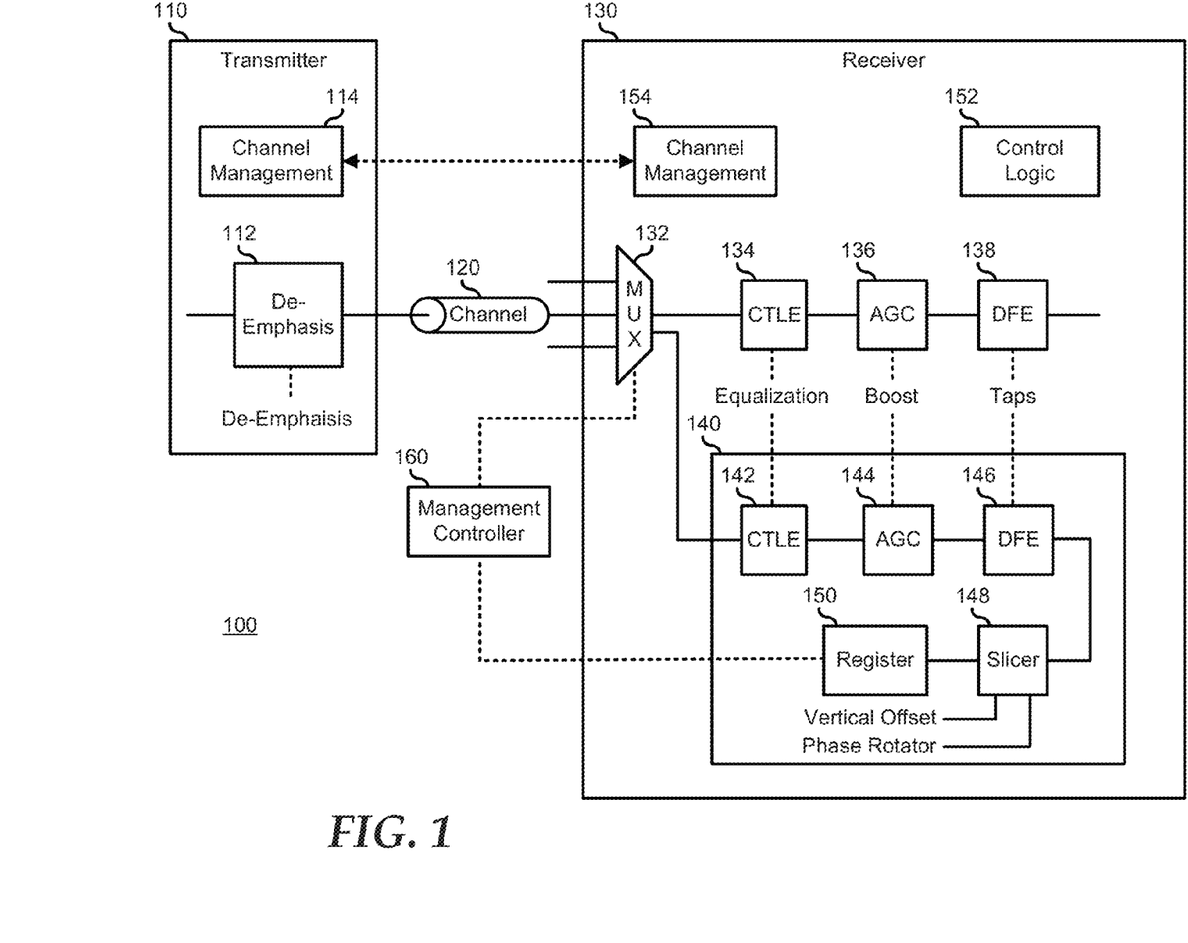
FIG. 1 illustrates a high speed serial interface according to an embodiment of the present disclosure.

FIG. 1 illustrates an embodiment of a high speed serial channel 100 of an information handling system. For the purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Serial channel 100 includes a transmitter 110, a transmission channel 120, and a receiver 130. Serial channel 100 represents one half of a bi-directional serial data link for communicating data from transmitter 110 located at a first component to receiver 130 located at a second component. The other half of the bi-directional serial data link is similar to serial channel 100, but with a receiver in the first component, and a transmitter in the second component, for communicating data back from the second component to the first component. Here, the components can be understood to include elements within an information handling system, such as components that are attached to one or more printed circuit board of the information handling system, where transmission channel 120 can represent one or more circuit traces on the printed circuit board, and can include one or more connectors. The components can also be understood to include devices of an information handling system, such as a hard drive, a storage array, and the like, that are separate from the printed circuit board of the information handling system, where transmission channel 120 can include one or more transmission cables. An example of serial channel 100 includes a PCI-Express (PCIe) channel that is in compliance with one or more PCIe specification, up to, and including the PCIe 4.0 Specification, a Serial ATA (SATA) channel that is in compliance with one or more SATA specification, up to, and including the SATA 3.2 Specification, a SAS channel that is in compliance with one or more SAS specification, up to and including the Serial Attached SCSI 4.0 Standard, or another high speed serial channel.

Serial channel 100 operates to provide back channel adaptation where transmitter 110 and receiver 130 communicate with each other to optimize and adjust various compensation values within the transmitter and the receiver to compensate for the insertion loss of transmission channel 120. A determination is made as to whether or not a set of compensation values is satisfactory based upon a determination of the bit error rate (BER) associated with the set of values. It is possible for multiple different sets of compensation values to result in acceptable BER in serial channel 100. Moreover, even on a particular information handling system, operating at different times, the back channel adaptation mechanism may operate to provide different sets of compensation values based upon minute variations in the operating condition of the information handling system. As such, serial channel 100 operates to perform the back channel adaptation repeatedly, recording the set of compensation values for each iteration of the back channel adaptation, in order to determine a most common or most frequently recurring set of compensation values. Then serial channel 100 further operates to use the most frequently recurring set of compensation values as a seed for further optimization of the receiver eye in order to determine the final nm time set of compensation values.

For example, a typical back channel adaptation operation can operate at a 10 gigabit per second (Gb/s) data rate, and can provide a training sequence of 2000 bits, such that the back channel adaptation operation takes 200 microseconds (μs), and serial channel 100 can operate to provide 1000 iterations of the back channel adaptation operation, such that the common set of compensation values is determined in 0.2 s. Using the common set of compensation values, serial channel 100 can adjust each value of the common set of compensation values by +/−1 setting value, and re-run the back channel adaptation operation in order to determine if the receiver eye is improved. Serial channel 100 can then select the set of values that produces the best receiver eye.

Transmitter 110 includes a de-emphasis module 112 and a channel management module 114. In operation, serial data is provided to de-emphasis module 112, and the de-emphasis module operates to provide a reduction in the signal levels of the serial data after a first data bit is transmitted, in order to de-emphasize the subsequent data bits and to transmit the de-emphasized serial data to receiver 130 via transmission channel 120. The amount of de-emphasis is determined based upon a de-emphasis setting. For example, transmitter 110 can support 21 de-emphasis settings which each prescribe a different amount of de-emphasis, from 0 dB to 10 dB, in 0.5 dB steps. Other numbers of settings and amounts of de-emphasis prescribed by the de-emphasis setting can be utilized, as needed or desired. Channel management module 114 will be described below.

Receiver 130 includes a multiplexor 132, a continuous time linear equalization (CTLE) module 134, an automatic gain control (AGC) module 136, a decision feedback equalization (DFE) module 138, a pseudo-latch 140, a control logic module 152, and a channel management module 154. In operation, the de-emphasized serial data is received by multiplexor 132, the multiplexor provides the received signal to CTLE module 134, and the CTLE module operates to provide compensation for inter-signal interference (ISI) in order to open the signal eye of the received signal. The amount of compensation is determined based upon an equalization setting. For example, receiver 130 can support 21 equalization settings which each prescribe a different amount of equalization, from 0 dB to 10 dB, in 0.5 dB steps. Other numbers of settings and amounts of equalization prescribed by the equalization setting can be utilized, as needed or desired.

The equalized signal is provided from CTLE module 134 to AGC module 136. AGC module 136 operates to provide linear gain to the signal received from CTLE module 134 to further open the signal eye of the received signal. The amount of gain is determined by a gain setting, and can support 21 gain settings which each prescribe a different amount of gain, for example, from 0 dB to 10 dB, in 0.5 dB steps. Other numbers of settings and amounts of gain prescribed by the gain setting can be utilized, as needed or desired.

The amplified signal is provided from AGC module 136 to DFE module 138. DFE module 138 operates to provide feedback based compensation to the received signal. The amount of compensation is determined by enabling a number of circuit feedback taps. For example, DFE module 138 can support up to 16 taps that provide compensation based upon up to 16 previous data points. In a particular embodiment, DFE module 138 can be turned off, thereby reducing the power consumed by receiver 130. In another embodiment, one or more tap of DFE module 138 can be turned on based upon the taps setting, while the rest of the taps are placed into a tri-state condition, that is, with power applied, but with the taps not providing feedback to the resultant DFE compensation. In yet another embodiment, one or more tap of DFE module 138 can be turned on based upon the taps setting, while the rest of the taps are turned off, thereby reducing the power consumed by receiver 130. Other numbers of taps can be utilized, as needed or desired.

Figure 2:
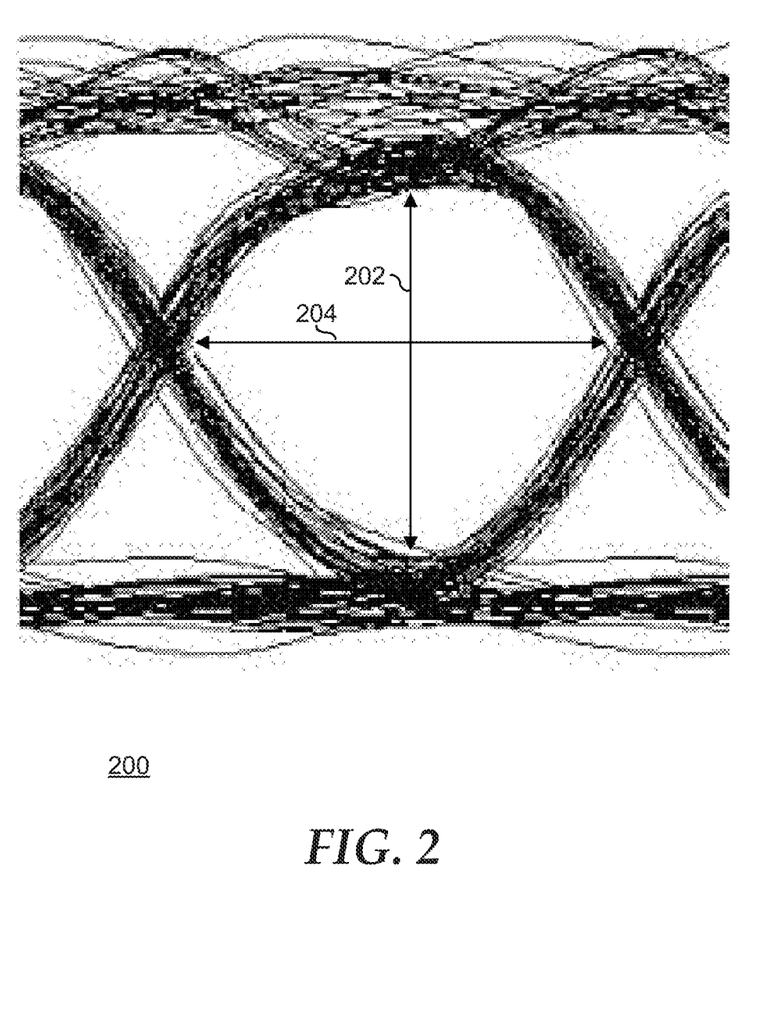
FIG. 2 illustrates a receiver eye diagram for the serial interface of FIG. 1.

In addition to providing the receive signal to CTLE module 134, multiplexor 132 provides the received signal to pseudo-latch 140 to characterize the receiver eye of the received signal. Pseudo-latch 140 provides a digital representation of the analog signal received by receiver 130, and analyzes the digital representation of the analog signal, such as the receiver eye 200 of FIG. 2, to determine the eye height 202 and the eye width 204 of the analog signal. Pseudo-latch 140 includes a CTLE module 142 similar to CTLE module 134, an AGC module 144 similar to AGC module 136, a DFE module 146 similar to DFE module 138, an adjustable slicer 148, and a register 150. CTLE module 142 is provided with the equalization setting, AGC module 144 is provided with the gain setting, and DFE module 146 is provided with the taps setting. In this way, pseudo-latch 140 operates to provide the same compensation for ISI as is provided in the main latch chain of CTLE module 134, AGC module 136, and DFE module 138, in order to open the signal eye of the received signal for further analysis, as described below.

Adjustable slicer 148 operates to select various timings and threshold levels for sampling the received and compensated signal from DFE module 146. As such, adjustable slicer 148 includes a phase rotator input which selects a timing offset for sampling the received and compensated signal, and a vertical offset input which selects a voltage offset for the detection threshold for determining the state of the received and compensated signal. At any given setting of the equalization setting, the gain setting, and the taps setting, the phase rotator input and the voltage offset input settings are adjusted, for example as "plus" and "minus" settings around a nominal phase and a nominal voltage offset associated with a slicer in the main latch chain. The adjustment levels are increased and decrease sequentially until the signal becomes undetectable. By determining the offsets from the nominal phase and nominal voltage offset levels, pseudo-latch 140 determines the eye characteristics, that is, the eye height and the eye width of receiver 130 for the given settings of the equalization setting, the gain setting, and the taps setting.

Register 150 stores the eye height and eye width information in order to determine a set of compensation values that provides the best receiver eye for receiver 130. A management controller 160 operates to coordinate the determination of receiver eye information for multiple serial channels similar to serial channel 100. As such, multiplexor 132 operates to receive inputs from multiple transmission channels similar to transmission channel 120, and selectively routes the received signals to pseudo-latch 140. In this way, a multi-channel device can include a single set of elements for determining the receiver eye information of multiple transmission channels.

In operation, control logic module 152 performs the back channel adaptation repeatedly, recording the set of compensation values for each iteration of the back channel adaptation in a memory of receiver 130, in order to determine a most common or most frequently recurring set of compensation values. In a particular embodiment, only the set of compensation values for receiver 130 are considered in determining the most frequently recurring set of compensation values. In another embodiment, the compensation values for both transmitter 110 and receiver 130 are considered in determining the most frequently recurring set of compensation values. In a particular embodiment, the memory includes a counter associated with each particular combination of compensation value settings, and each time a particular set of compensation values is derived, the counter is incremented. Then, when the iterations of the back channel adaptation are complete, control logic module 152 determines which counter includes the highest count. In another embodiment, receiver 130 includes a number of storage locations that is equal to the number of iterations, and on each successive iteration, the set of compensation values for that iteration are stored in the associated storage location. Then, when the iterations of the back channel adaptation are complete, control logic module 152 parses the values of the storage locations to determine the most common value.

Control logic module 152 then uses the most common set of compensation values as a seed for further optimization of the receiver eye, by directing each of de-emphasis module 112, CTLE module 134, AGC module 136, and DVE module 138 to iteratively adjust the respective compensation values by +/−one (1) setting value, and direct the received signal through multiplexor 132 to pseudo-latch 140 to determine the receiver eye height and eye width associated with each adjusted setting. Finally, the set of compensation values that resulted in the best eye height and eye width is utilized as the final run time set of compensation values.

Figure 3:
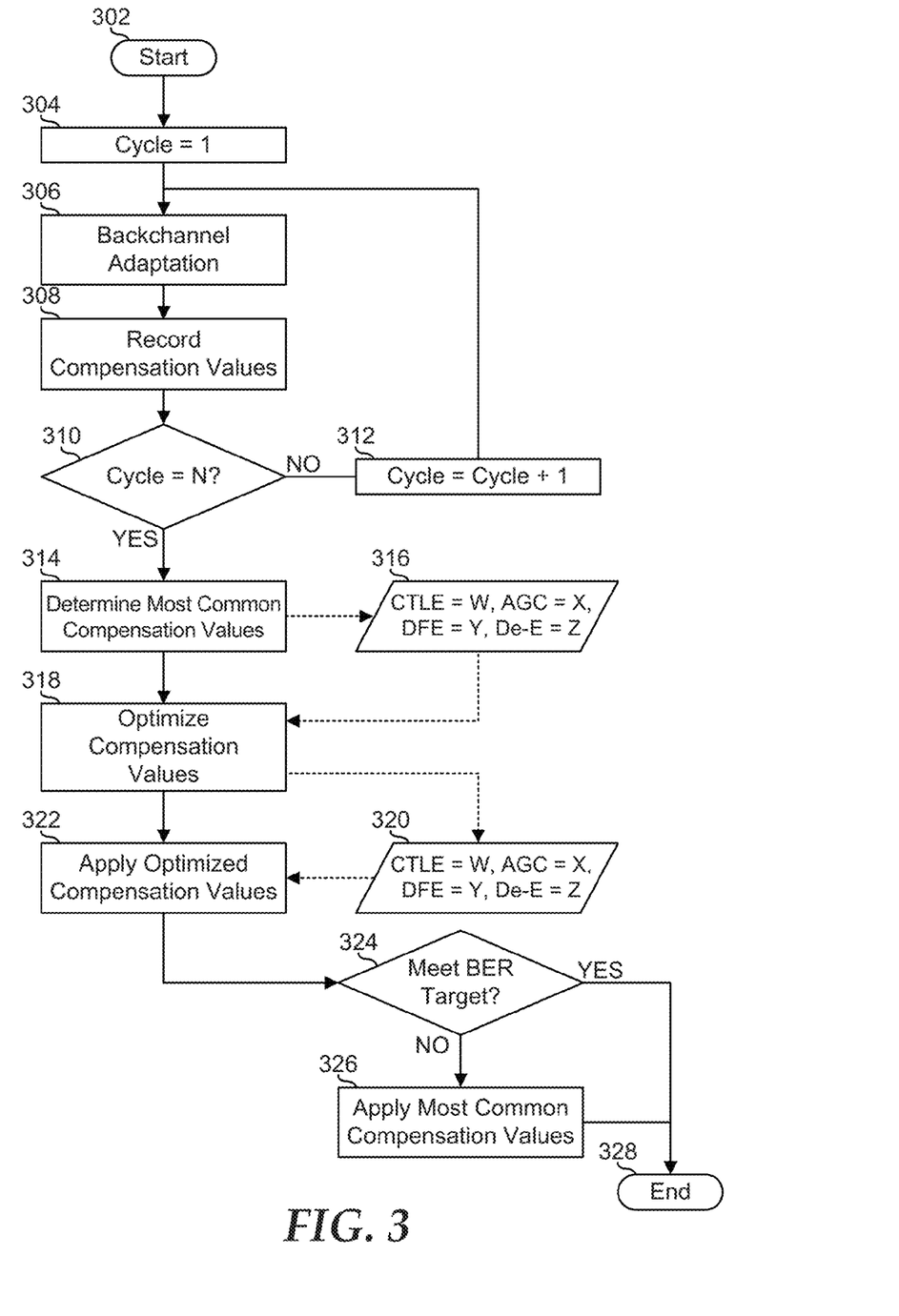
FIG. 3 is a flowchart illustrating a method of determining compensation values in a serial interface according to an embodiment of the present disclosure.

FIG. 3 illustrates a method of determining compensation values in a serial interface, starting at block 302. A cycle counter is set to one (1) in block 304. A first back channel adaptation on a high speed serial link is performed in block 306, and a set of compensation values for the first back channel adaptation are recorded in block 308. A decision is made as to whether or not the cycle count is equal to N in decision block 310, where N is a number of iterations that are to be performed in determining the most common set of compensation values. If the cycle count is not equal to N, the "NO" branch of decision block 310 is taken, the cycle count is incremented by one (1) in block 312, and the method returns to block 306 where a next back channel adaptation is performed. If the cycle count is equal to N, the "NO" branch of decision block 310 is taken, the most common set of compensation values is determined in block 314, and the compensation values are optimized in block 318. The most common set of compensation values are stored in data block 316 for use in optimization block 318. A method of optimizing the compensation values is described in FIG. 4, below. The optimized compensation values are stored in data block 320. The optimized compensation values are applied to the serial link in block 322 using the values stored in data block 320. A determination is made as to whether or not a target BER is being met by the optimized settings in decision block 324. For example, the optimized settings can be utilized in communications over the serial interface for a predetermined timeframe and the BER can be extracted from the data stream via various BER calculation methods as are known in the art. If the target BER is being met by the optimized settings, the "YES" branch of decision block 324 is taken and the method ends in block 328. If not, the "NO" branch of decision block 324 is taken, the most common compensation values are applied to the serial link in block 326, and the method ends in block 328.

Figure 4:
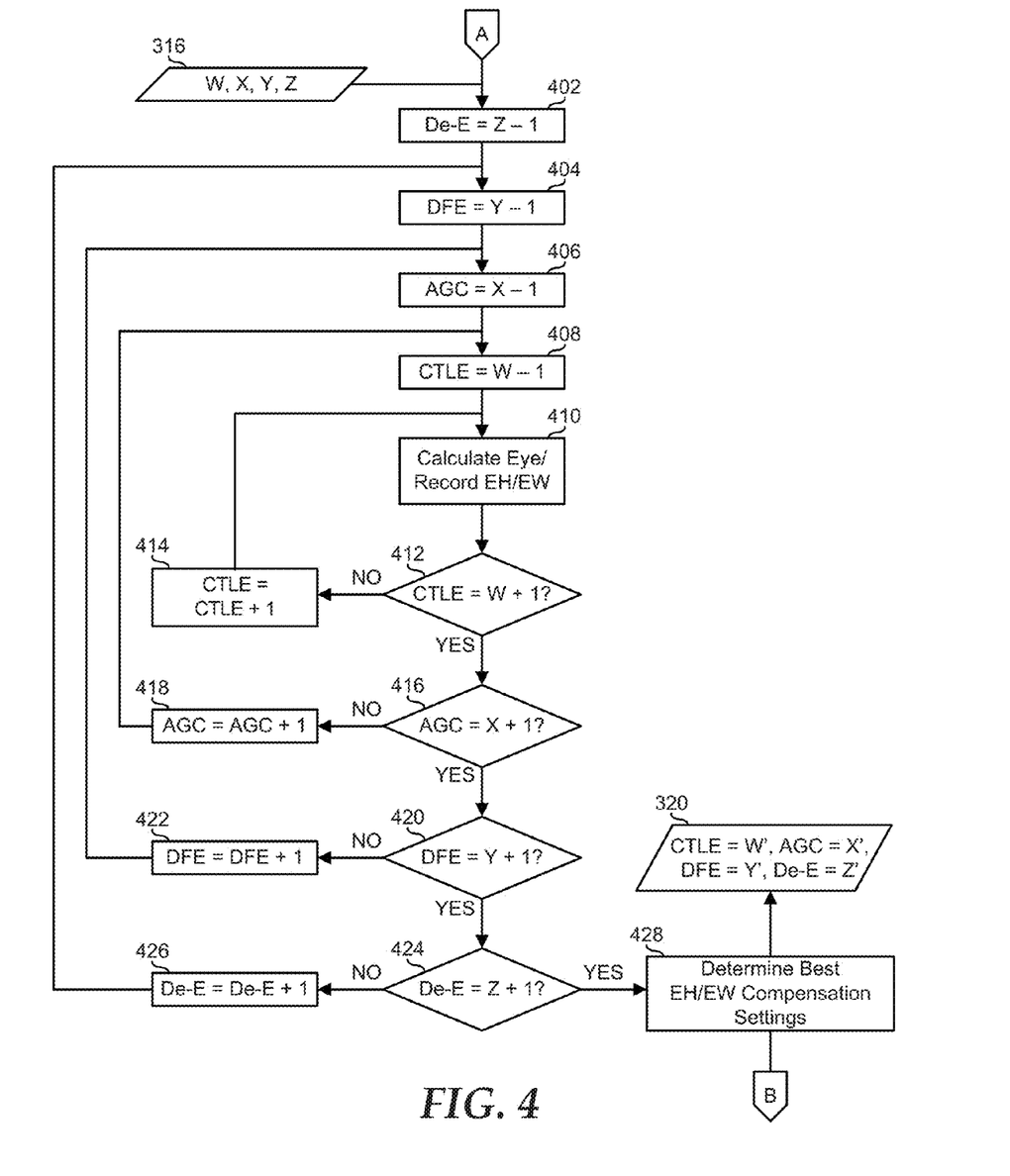
FIG. 4 is a flowchart illustrating a method of optimizing compensation values in a serial interface according to an embodiment of the present disclosure.

FIG. 4 illustrates a method of optimizing compensation values in a serial interface as shown in block 318 of FIG. 3. The method begins by applying the most common compensation values from data block 316. A de-emphasis setting is reduced by one (1) in block 402, a number of DFE taps is reduced by one (1) in block 404, a gain setting is reduced by one (1) in block 406, and a compensation setting is reduced by one (1) in block 408. The receiver eye is evaluated to calculate the EH/EW for the current settings, and the EH/EW is recorded in block 410.

A decision is made as to whether or not the compensation setting is set to the one (1) setting above the most common compensation setting in decision block 412. If not, the "NO" branch of decision block 412 is taken, the compensation setting is increased by one (1) in block 414, and the method returns to block 410 where the receiver eye is evaluated for the new settings. If the compensation setting is set to the one (1) setting above the most common compensation setting, the "YES" branch of decision block 412 is taken, and a decision is made as to whether or not the gain setting is set to the one (1) setting above the most common gain setting in decision block 416. If not, the "NO" branch of decision block 416 is taken, the gain setting is increased by one (1) in block 418, and the method returns to block 408 where the compensation setting is reset to one (1) setting less than the most common gain setting. If the gain setting is set to the one (1) setting above the most common gain setting, the "YES" branch of decision block 416 is taken, and a decision is made as to whether or not the taps setting is set to the one (1) setting above the most common taps setting in decision block 420. If not, the "NO" branch of decision block 420 is taken, the taps setting is increased by one (1) in block 422, and the method returns to block 406 where the gain setting is reset to one (1) setting less than the most common gain setting. If the taps setting is set to the one (1) setting above the most common taps setting, the "YES" branch of decision block 420 is taken, and a decision is made as to whether or not the de-emphasis setting is set to the one (1) setting above the most common de-emphasis setting in decision block 424. If not, the "NO" branch of decision block 424 is taken, the de-emphasis setting is increased by one (1) in block 422, and the method returns to block 404 where the taps setting is reset to one (1) setting less than the most common taps setting. If the de-emphasis setting is set to the one (1) setting above the most common de-emphasis setting, the "YES" branch of decision block 424 is taken, and the settings associated with the best EH/EW are determined in block 428, and the best settings are provided to data block 320.

Figure 5:
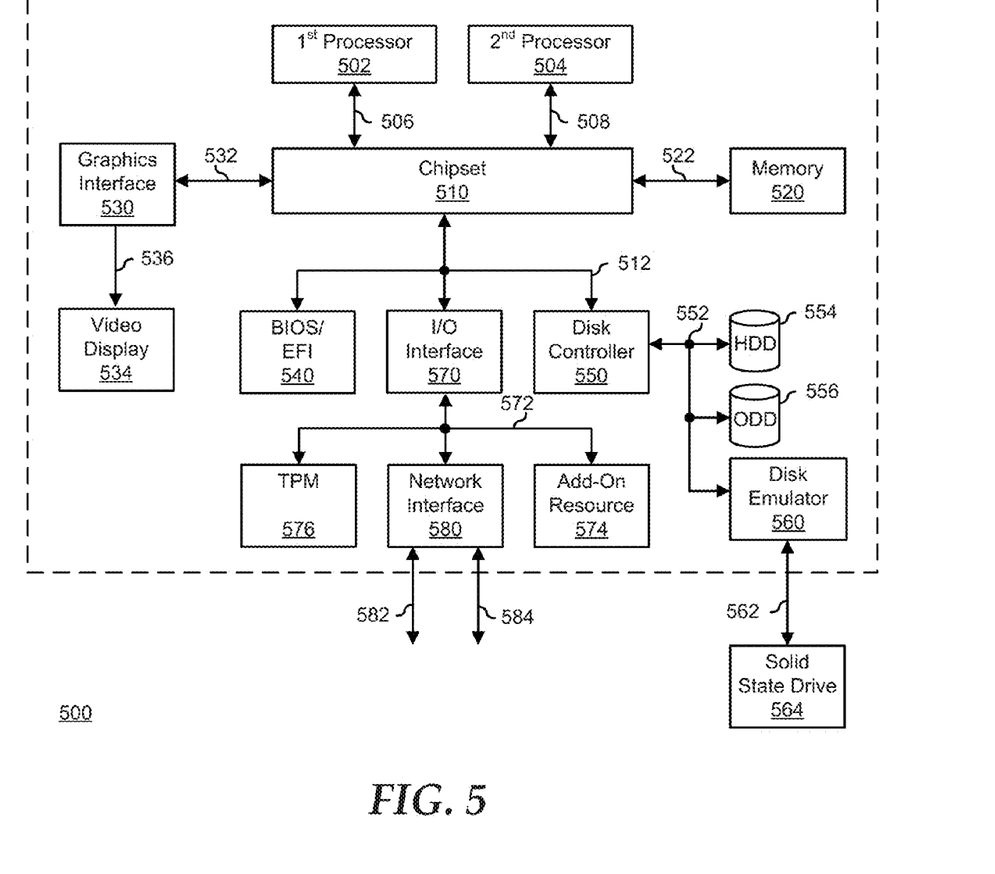
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), unembedded device such as a System-on-a-Chip (SoC), or other control logic hardware information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574, to a TPM 576, and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A receiver, comprising:
a plurality of equalization circuits each configurable to provide a selectable compensation value to a data bitstream received by the receiver; and
a controller configured to:
perform a plurality of back channel adaptations on the data bitstream to derive a plurality of sets of compensation value settings, wherein each back channel adaptation achieves a target bit error rate for the receiver, and wherein each back channel adaptation is associated with a particular set of compensation value settings of the plurality of sets of compensation value settings for the plurality of equalization circuits;
determine a most common set of compensation value settings derived from the plurality of sets of compensation value settings; and
generate an optimized set of compensation value settings based on the most common set of compensation value settings.

2. The receiver of claim 1, wherein the receiver is adapted to convert a signal associated with the data bitstream to a digital representation of the signal, wherein the optimized set of compensation value settings is further based upon the digital representation of the signal.

3. The receiver of claim 2, wherein the digital representation of the signal is a receiver eye representation of the signal.

4. The receiver of claim 3, wherein the optimized set of compensation value settings is further based upon an eye height and an eye width.

5. The receiver of claim 4, wherein in generating the optimized set of compensation value settings, the controller is further configured to:
determine the eye height and the eye width for an adjusted set of compensation value settings, wherein the adjusted set of compensation value settings comprises adjusting each compensation value setting of the most common set of compensation value settings by increasing each associated compensation value setting by one step or by decreasing each associated compensation value setting by one step; and
determine a best set of compensation value settings, wherein the best set of compensation value settings comprises a particular set of compensation value settings from the of compensation value settings that is associated with one of the greatest eye height and the greatest eye width.

6. The receiver of claim 1, wherein each of the plurality of equalization circuits comprises a continuous time linear equalizer, a gain circuit, and a decision feedback equalizer.

7. The receiver of claim 6, wherein:
the receiver further comprises a channel management circuit configured to communicate with a transmitter that is coupled to the receiver via a channel; and
each set of compensation value settings of the plurality of sets of compensation value settings includes a transmitter compensation value setting, the transmitter compensation value setting being received by the channel management circuit.

8. A method, comprising:
performing, by a control module of a receiver, a plurality of back channel adaptations on a data bitstream to derive a plurality of sets of compensation value settings, wherein each back channel adaptation achieves a target bit error rate for the receiver, and wherein each back channel adaptation is associated with a particular set of compensation value settings of the plurality of sets of compensation value settings for a plurality of equalization modules, each equalization module being configurable to provide a selectable compensation value to the data bitstream;
determining, by the control module, a most common set of compensation value settings derived from the plurality of sets of compensation value settings; and
generating, by the control module, an optimized set of compensation value settings based on the most common set of compensation value settings.

9. The method of claim 8, further comprising:
converting a signal associated with the data bitstream to a digital representation of the signal, wherein determining the optimized set of compensation value settings is further based upon the digital representation of the signal.

10. The method of claim 9, wherein the digital representation of the signal is a receiver eye representation of the signal.

11. The method of claim 10, wherein determining the optimized set of compensation value settings is further based upon one of an eye height and an eye width.

12. The method of claim 11, wherein in generating the optimized set of compensation value settings, the method further comprises:
determining, by the control module, the eye height and the eye width for an adjusted set of compensation value settings, wherein the adjusted set of compensation value settings comprises adjusting each compensation value setting of the most common set of compensation value settings by increasing each associated compensation value setting by one step or by decreasing each associated compensation value setting by one step; and
determining, by the control module, a best set of compensation value settings, wherein the best set of compensation value settings comprises a particular set of compensation value settings from the adjusted set of compensation value settings that is associated with one of the greatest eye height and the greatest eye width.

13. The method of claim 8, wherein each of the plurality of equalization modules comprises a continuous time linear equalization module, a gain control module, and a decision feedback equalization module.

14. The method of claim 13, wherein each set of compensation value settings of the plurality of sets of compensation value settings includes a transmitter compensation value setting, the transmitter compensation value setting being received by a channel management module of the receiver from a transmitter that is coupled to the receiver via a channel.

15. A non-transitory computer-readable medium including code, wherein the code, when executed by a processor, performs a method comprising:

performing, by a control module of a receiver, a plurality of back channel adaptations on a data bitstream to derive a plurality of sets of compensation value settings, wherein each back channel adaptation achieves a target bit error rate for the receiver, and wherein each back channel adaptation is associated with a particular set of compensation value settings of the plurality of sets of compensation value settings for a plurality of equalization modules, each equalization module being configurable to provide a selectable compensation value to the data bitstream;

determining, by the control module, a most common set of compensation value sets of compensation value settings derived from the plurality of sets of compensation value settings; and generating, by the control module, an optimized set of compensation value settings based on the most common set of compensation value settings.

16. The computer-readable medium of claim 15, the method further comprising:

converting a signal associated with the data bitstream to a digital representation of the signal, wherein the optimized set of compensation value settings is further based upon the digital representation of the signal.

17. The computer-readable medium of claim 16, wherein the digital representation of the signal is a receiver eye representation of the signal.

18. The computer-readable medium of claim 17, wherein the optimized set of compensation value settings is further based upon an eye height and an eye width.

19. The computer-readable medium of claim 18, wherein in generating the optimized set of compensation value settings, the method further comprises:

determining, by the control module, the eye height and the eye width for an adjusted set of compensation value settings, wherein the adjusted set of compensation value settings comprises adjusting each compensation value setting of the most common set of compensation value settings by increasing each associated compensation value setting by one step or by decreasing each associated compensation value setting by one step; and determining, by the control module, a best set of compensation value settings, wherein the best set of compensation value settings comprises a particular set of compensation value settings from the adjusted set of compensation value settings that is associated with one of the greatest eye height and the greatest eye width.

20. The computer-readable medium of claim 15, wherein each of the plurality of equalization modules comprises a continuous time linear equalization module, a gain control module, and a decision feedback equalization module.

\* \* \* \* \*